United States Patent
Hidaka

(10) Patent No.: US 10,336,296 B2
(45) Date of Patent: Jul. 2, 2019

(54) LOCKING/UNLOCKING SYSTEM

(71) Applicant: NISSAN MOTOR CO., LTD., Yokohama-shi, Kanagawa (JP)

(72) Inventor: Shinichiro Hidaka, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/563,685

(22) PCT Filed: Apr. 7, 2015

(86) PCT No.: PCT/JP2015/060797
§ 371 (c)(1),
(2) Date: Oct. 2, 2017

(87) PCT Pub. No.: WO2016/162936
PCT Pub. Date: Oct. 13, 2016

(65) Prior Publication Data
US 2018/0072266 A1 Mar. 15, 2018

(51) Int. Cl.
*B60R 25/00* (2013.01)
*G05B 19/00* (2006.01)
(Continued)

(52) U.S. Cl.
CPC .............. *B60R 25/24* (2013.01); *B60L 53/12* (2019.02); *B60L 53/65* (2019.02);
(Continued)

(58) Field of Classification Search
CPC .................. B60R 25/24; H02J 7/0004; G07C 2009/00769; G07C 2009/00777; E05B 49/004
See application file for complete search history.

(56) References Cited

U.S. PATENT DOCUMENTS 8,265,816 B1 * 9/2012 LaFrance .............. B60R 25/045
701/22
9,162,581 B2 * 10/2015 Ichikawa ................ B60L 1/006
(Continued)

FOREIGN PATENT DOCUMENTS

JP 2012-161235 A 8/2012
JP 2012161235 A * 8/2012
(Continued)

*Primary Examiner* — Quang Pham
(74) *Attorney, Agent, or Firm* — Foley & Lardner LLP

(57) ABSTRACT

A locking/unlocking system includes: a power reception device having a vehicle coil provided in a vehicle and receiving power at a first frequency in a non-contact manner from a ground coil provided on the ground; an operation switch outputting an operation signal in response to a user operation; a locking/unlocking controller that, in response to an input of an operation signal, conducts wireless communication with a key device located within a predetermined distance at a second frequency close to the first frequency and that, in response to successful wireless communication with the key device, locks/unlocks a lock provided in the vehicle; a signal determining part that outputs an input operation signal to the locking/unlocking controller; and a wiring switch that connects wiring so that the operation signal output from the operation switch is input into the signal determining part during a power reception operation of the power reception device.

5 Claims, 5 Drawing Sheets

(51) Int. Cl.
*G05B 23/00* (2006.01)
*G06F 7/00* (2006.01)
*G06F 7/04* (2006.01)
*G08B 29/00* (2006.01)
*G08C 19/00* (2006.01)
*H04B 1/00* (2006.01)
*H04B 3/00* (2006.01)
*H04Q 1/00* (2006.01)
*H04Q 9/00* (2006.01)
*B60R 25/24* (2013.01)
*E05B 49/00* (2006.01)
*H02J 7/00* (2006.01)
*B60R 25/20* (2013.01)
*B60L 53/12* (2019.01)
*B60L 53/65* (2019.01)
*G07C 9/00* (2006.01)

(52) U.S. Cl.
CPC .......... *B60R 25/2072* (2013.01); *E05B 49/00* (2013.01); *E05B 49/004* (2013.01); *H02J 7/00* (2013.01); *H02J 7/0004* (2013.01); *B60L 2250/10* (2013.01); *B60L 2270/147* (2013.01); *G07C 2009/00769* (2013.01); *G07C 2009/00777* (2013.01)

(56) References Cited

U.S. PATENT DOCUMENTS

| | | | |
|---|---|---|---|
| 9,225,317 B1* | 12/2015 | Wadhwa | H03K 19/00315 |
| 9,834,104 B2* | 12/2017 | Tsukamoto | H02J 5/005 |
| 10,008,883 B2* | 6/2018 | Ohashi | B60L 11/1838 |
| 2010/0211272 A1* | 8/2010 | Ichihara | B67D 7/145 |
| | | | 701/49 |
| 2012/0153894 A1* | 6/2012 | Widmer | H04B 5/0037 |
| | | | 320/108 |
| 2013/0015951 A1* | 1/2013 | Kuramochi | H01R 13/6397 |
| | | | 340/5.64 |
| 2013/0249478 A1* | 9/2013 | Hirano | H02J 7/0047 |
| | | | 320/108 |
| 2013/0313895 A1* | 11/2013 | Asselin | B60L 11/182 |
| | | | 307/9.1 |
| 2013/0342164 A1* | 12/2013 | Choi | H02J 7/007 |
| | | | 320/109 |
| 2014/0103871 A1* | 4/2014 | Maikawa | H02J 7/025 |
| | | | 320/108 |
| 2014/0103872 A1* | 4/2014 | Ichikawa | H02J 50/12 |
| | | | 320/108 |
| 2014/0114504 A1* | 4/2014 | Yamashita | B60R 25/40 |
| | | | 701/2 |
| 2015/0202971 A1* | 7/2015 | Taniguchi | B60L 11/182 |
| | | | 320/108 |
| 2015/0278038 A1* | 10/2015 | Halker | G06F 11/20 |
| | | | 714/3 |
| 2016/0039301 A1* | 2/2016 | Igarashi | H02J 7/041 |
| | | | 320/157 |
| 2016/0121735 A1* | 5/2016 | Sugano | B60L 11/1818 |
| | | | 320/109 |
| 2016/0141919 A1* | 5/2016 | Ohashi | B60L 11/1838 |
| | | | 320/108 |
| 2016/0214496 A1* | 7/2016 | Iwai | B60L 11/1846 |
| 2016/0257211 A1* | 9/2016 | Kimura | B60L 11/1818 |
| 2016/0280077 A1* | 9/2016 | Tsukamoto | B60L 3/0069 |
| 2016/0288653 A1* | 10/2016 | Tsukamoto | H02J 5/005 |
| 2016/0288665 A1* | 10/2016 | Tsukamoto | H02J 5/005 |
| 2016/0297312 A1* | 10/2016 | Tsukamoto | B60L 11/182 |
| 2016/0368391 A1* | 12/2016 | Kojima | B60L 3/0069 |
| 2017/0113557 A1* | 4/2017 | Tsukamoto | B60L 11/18 |

FOREIGN PATENT DOCUMENTS

| | | |
|---|---|---|
| JP | 2013-217129 A | 10/2013 |
| JP | 2014-116999 A | 6/2014 |

* cited by examiner

LOCKING/UNLOCKING SYSTEM

TECHNICAL FIELD

The present invention relates to a locking/unlocking system that locks/unlocks a vehicle including a non-contact power reception device.

BACKGROUND ART

In a vehicle charged in a non-contact manner by using a coil on a ground side and a coil on a vehicle side, there has been proposed a system that locks/unlocks the vehicle by wireless communication with a key which is an electronic device without using a mechanical key (see Patent Literature 1). The technology described in Patent Literature 1 stops a charging operation when a switch in a door of the vehicle is pressed, conducts communication with the key in response to stop of the charging operation, and thereby prevents interference caused by non-contact charging.

CITATION LIST

Patent Literature

Patent Literature 1: Japanese Patent Laid-Open Publication No. 2014-116999

SUMMARY OF INVENTION

However, in the technology described in Patent Literature 1, in order to enable a controller relating to locking/unlocking to communicate with a controller executing control relating to non-contact charging, a complicated specification change from the prior-art configuration is needed in a configuration relating to locking/unlocking.

The present invention was made in view of the aforementioned problem and has an object to provide a locking/unlocking system which can easily apply a system which can reduce a sense of discomfort of a user during interference caused by non-contact power transmission.

The locking/unlocking system is so configured that, in the non-contact power transmission, an operation signal from an operation switch is not input into the controller relating to locking/unlocking but it is once input into the controller relating to the non-contact power transmission.

DESCRIPTION OF EMBODIMENTS

Figure 1:
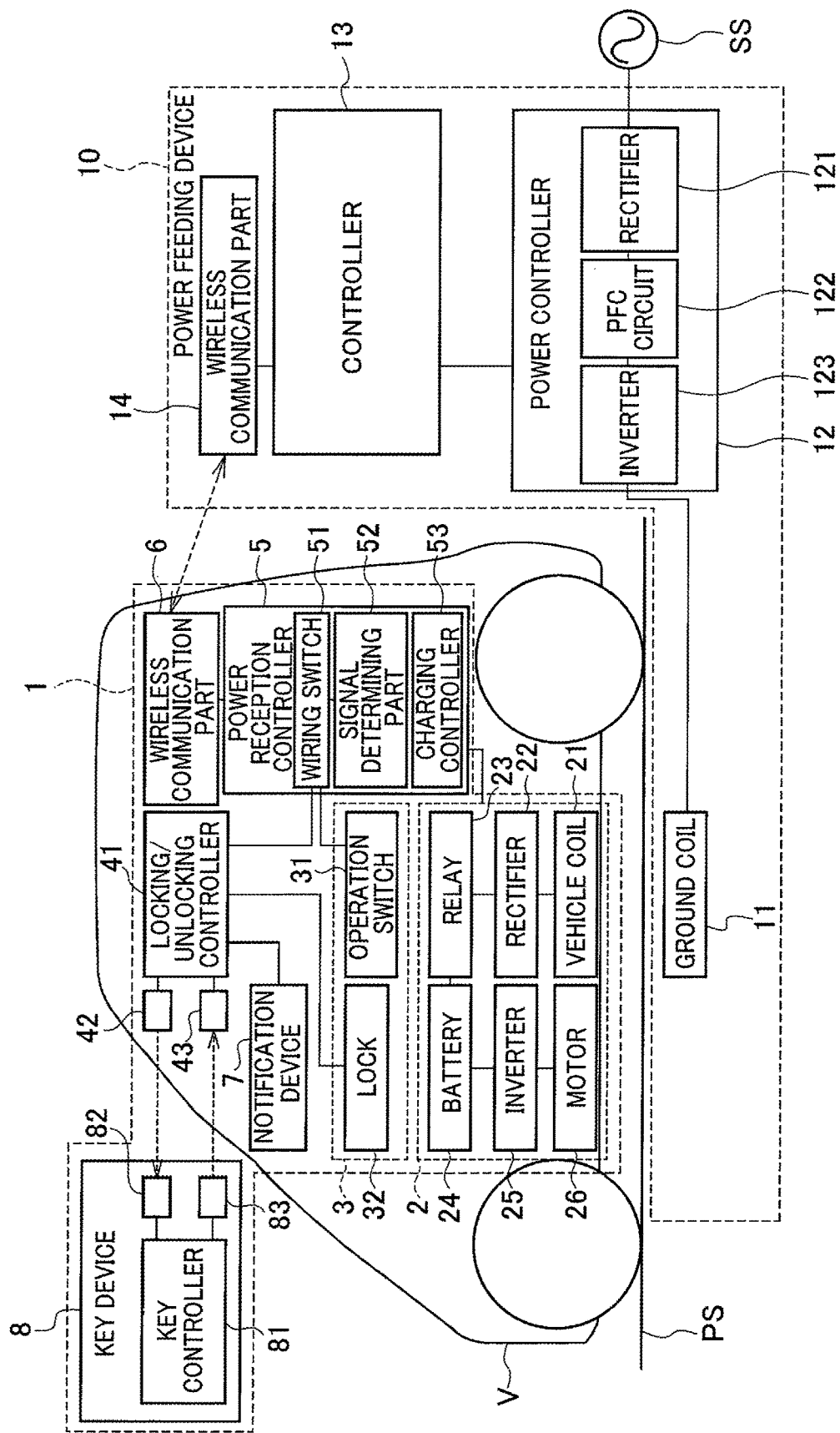
FIG. 1 is a schematic block diagram for explaining a basic configuration of a non-contact power feeding system to which a locking/unlocking system according to an embodiment of the present invention is applied.

An embodiment of the present invention will be explained with reference to the drawings. In the description of the drawings, the same or similar portions are given the same or similar reference numerals, and duplicated explanation will be omitted.

(Non-Contact Charging System)

A non-contact power feeding system to which a locking/unlocking system 1 according to the embodiment of the present invention is applied includes, as illustrated in FIG. 1, a vehicle V, a key device 8 which is a key of the vehicle V, and a power feeding device 10 for feeding power to the vehicle V in a non-contact manner. The vehicle V is a vehicle, such as an electric vehicle and a hybrid vehicle, driven by using power.

The power feeding device 10 includes a ground coil 11 arranged in a parking space PS for power feeding, a power controller 12 for controlling power to be supplied to the ground coil 11, a controller 13 for executing control required for processing performed by the power feeding device 10, and a wireless communication part 14. The ground coil 11 feeds power to a vehicle coil 21 provided in the vehicle V in a non-contact manner. The ground coil 11 and the vehicle coil 21 are constituted by wound conductive wires, respectively, and function as a primary coil and a secondary coil.

The power controller 12 includes a rectifier 121, a power-factor correction (PFC) circuit 122, and an inverter 123. The power controller 12 converts an alternating current (AC) power sent from an AC power supply SS to a high-frequency AC power and feeds it to the ground coil 11.

The rectifier 121 rectifies an output AC power from the AC power supply SS and outputs it to the PFC circuit 122. The PFC circuit 122 improves a power factor by shaping an output waveform from the rectifier 121 and outputs it to the inverter 123.

The inverter 123 is a power conversion circuit including a pulse-width modulation (PWM) control circuit having a switching element, such as an insulating gate bipolar transistor (IGBT). The inverter 123 converts a direct current (DC) power to an AC power with a low frequency of approximately 85 kHz, for example, by switching on/off of the switching element on the basis of a switching control signal and supplies it to the ground coil 11.

The wireless communication part 14 conducts communication bidirectionally with a wireless communication part 6 provided in the vehicle V in accordance with control by the controller 13. The controller 13 transmits a signal notifying start of power feeding from the power feeding device 10 to the vehicle V side and receives a signal requesting start of the power feeding from the power feeding device 10 from the vehicle V side by communication between the wireless communication part 14 and the wireless communication part 6. Moreover, the controller 13 executes switching control of the inverter 123 by generating a switching control signal and controls power to be supplied to the ground coil 11.

The vehicle V includes a power reception device 2, a door part 3, a locking/unlocking controller 41, an LF (Low Frequency) transmitter 42, an RF (Radio frequency) receiver 43, a power reception controller 5, the wireless communication part 6, and a notification device 7. The power reception device 2 includes the vehicle coil 21, a rectifier 22, a relay 23, a battery 24, an inverter 25, and a motor 26.

The vehicle coil 21 is provided on a bottom surface of the vehicle V. The vehicle coil 21 is brought into a state facing the ground coil 11 provided on the ground away from each other by a predetermined distance when the vehicle V is properly parked in the parking space PS. The vehicle coil 21 generates magnetic coupling with the ground coil 11 when power is supplied to the ground coil 11 from the power controller 12, and power is transmitted in a non-contact manner from the ground coil 11 by electromagnetic induction. That is, the vehicle coil 21 receives power from the ground coil in the non-contact manner at a first frequency.

The rectifier 22 rectifies the AC power received in the vehicle coil 21 to a DC. The relay 23 includes a relay switch for which ON/OFF is switched in accordance with the control by the power reception controller 5. The relay 23 separates the battery 24 side from the rectifier 22 side by turning off the relay switch. The battery 24 is constituted by a plurality of secondary cells connected to each other.

The inverter 25 is a power conversion circuit including a PWM control circuit having a switching element, such as IGBT. The inverter 25 converts the DC power output from the battery 24 to the AC power by switching ON/OFF of the switching element on the basis of the switching control signal and supplies it to the motor 26 as a driving force of the vehicle V. The motor 26 is constituted by a three-phase AC motor, for example.

The door part 3 is provided on an outer surface of the vehicle V and includes an operation switch 31 outputting an operation signal in response to a user operation and a lock 32 which is provided on the door of the vehicle V and locks/unlocks the door by an actuator driven in accordance with control by the locking/unlocking controller 41.

The locking/unlocking controller 41 conducts wireless communication with the key device 8 located within a predetermined distance in response to an input of the operation signal of the operation switch 31 and locks/unlocks the lock 32 in response to successful wireless communication with the key device 8. The locking/unlocking controller 41 is an electronic control unit (ECU) controlling processing relating to locking/unlocking of the lock 32.

The locking/unlocking controller 41 conducts wireless communication with the key device 8 by using the LF transmitter 42 and an RF receiver 43. The LF transmitter 42 transmits a predetermined LF signal in accordance with control by the locking/unlocking controller 41. The RF receiver 43 receives an RF signal and outputs it to the locking/unlocking controller 41.

The key device 8 includes a key controller 81, an LF receiver 82, and an RF transmitter 83. The key controller 81 conducts wireless communication with the locking/unlocking controller 41 of the vehicle V by using the LF receiver 82 and the RF transmitter 83. The LF receiver 82 receives an LF signal and outputs it to the key controller 81. The key controller 81 controls the RF transmitter 83 so that the RF transmitter 83 transmits an RF signal including an identifier (ID) of the key device 8 in response to an input of a predetermined LF signal.

Here, the communication between the LF transmitter 42 and the LF receiver 82 is conducted at a second frequency close to the first frequency. The LF transmitter 42 transmits an LF signal at a low frequency of approximately 130 kHz, for example. In the embodiment of the present invention, the phrase "close to the first frequency" means such a frequency that interference can be caused by the signal at the first frequency in communication at the second frequency.

The RF transmitter 83 transmits an RF signal at an ultra shortwave of approximately 300 MHz, for example. The locking/unlocking controller 41 receives the received RF signal from the RF receiver 43. The locking/unlocking controller 41 determines that wireless communication with the key device 8 was successful when an ID included in the RF signal matches the ID stored in advance. The locking/unlocking controller 41 locks/unlocks the lock 32 in response to the successful wireless communication with the key device 8.

The power reception controller 5 is an ECU controlling a power reception operation of the vehicle coil 21 mainly for charging the battery 24. The power reception controller 5 includes a wiring switch 51, a signal determining part 52, and a charging controller 53. The wiring switch 51 is mounted on the power reception controller 5, for example, and is connected between the operation switch 31 and the locking/unlocking controller 41. The wiring switch 51 is constituted by a mechanical switch that mechanically switches wiring and an actuator that switches the mechanical switch in accordance with the control by the power reception controller 5. The wiring switch 51 is connected between the operation switch 31 and the locking/unlocking controller 41.

Figure 2:
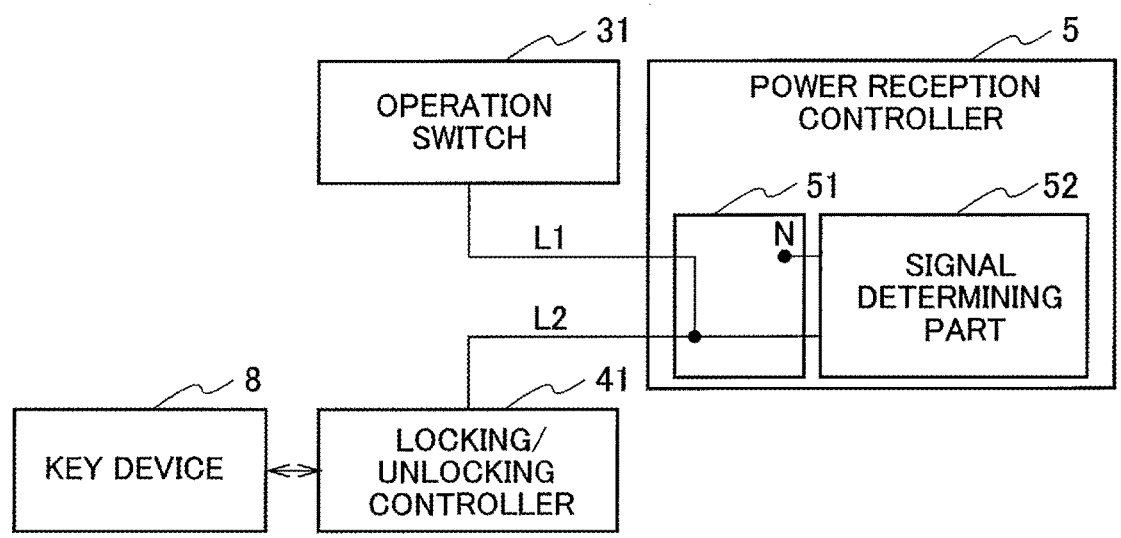
FIG. 2 is a block diagram for explaining a state of a wiring switch provided in the locking/unlocking system according to the embodiment of the present invention when a power reception device is during a non-power-reception operation.

The wiring switch 51 connects wiring so that an operation signal output from the operation switch 31 is directly input into the locking/unlocking controller 41 during a non-power-reception operation of the power reception device 2 as illustrated in FIG. 2. The wiring switch 51 electrically connects the other end of wiring L1 with one end connected to the operation switch 31 to wiring L2 with one end connected to the locking/unlocking controller 41 during the non-power-reception operation of the power reception device 2. The wiring L2 has the other end connected to the signal determining part 52 through the wiring switch 51. The wiring L2 is electrically connected to the wiring L1 when the other end of the wiring L2 is connected in the wiring switch 51.

Figure 3:
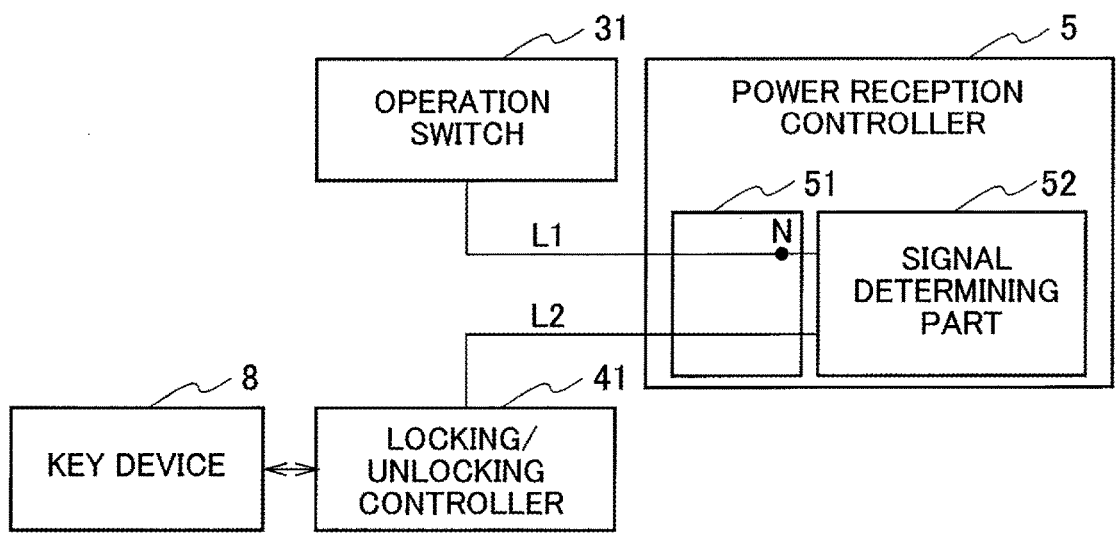
FIG. 3 is a block diagram for explaining a state of the wiring switch provided in the locking/unlocking system according to the embodiment of the present invention when the power reception device is during a power reception operation.

The wiring switch 51 connects the wiring so that the operation signal output from the operation switch 31 is directly input into the signal determining part 52 during the power reception operation of the power reception device 2 as illustrated in FIG. 3. The wiring switch 51 electrically connects the operation switch 31 with the signal determining part 52 when the other end of the wiring L1 is connected to a contact N connected to the signal determining part 52 and separates the wiring L1 from the wiring L2.

The signal determining part 52 stores the operation signal input from the operation switch 31. The signal determining part 52, when the operation signal of the operation switch 31 is input, outputs the input operation signal to the locking/unlocking controller 41. Moreover, the signal determining part 52 suppresses the power reception operation of the power reception device 2 by transmitting a signal requesting stop of power feeding to the power feeding device 10 through the wireless communication part 6 in response to the input of the operation signal.

The signal determining part 52 determines, from the communication with the power feeding device 10 or the power reception state of the power reception device 2, whether or not the power reception operation of the power reception device 2 has been suppressed to a predetermined state (0 W, for example) and the suppression is completed. The signal determining part 52 outputs the stored operation signal to the locking/unlocking controller 41 in response to completion of the suppression of the power reception operation of the power reception device 2.

The charging controller 53 starts power feeding from the ground coil 11 by transmitting a signal requesting start of power feeding and the like by the power feeding device 10 to the controller 13 through the wireless communication parts 6 and 14. The power reception device 2 supplies the power received in the vehicle coil 21 from the ground coil 11 to the battery 24 so as to charge the battery 24 by controlling driving of the rectifier 22 and the relay 23 in accordance with the control by the charging controller 53.

The charging controller 53 is connected to a controller that manages switching control of the inverter 25, a charged state (SOC) of the battery 24 and the like via a CAN (Controller Area Network). The charging controller 53, when having received a signal notifying that the battery 24 is fully charged from this controller via the CAN, transmits a signal requesting completion of the power feeding to the controller 13 through the wireless communication parts 6 and 14.

The notification device 7 is constituted by a light source that emits light, a display device that displays characters and images, a speaker that outputs sounds, such as an alarm sound and locking/unlocking sounds. The notification device 7 notifies the user of information by outputting light or sound in accordance with the control by the locking/unlocking controller 41.

(Operation of Locking/Unlocking System 1)

An example of an operation of the locking/unlocking system 1 according to the embodiment of the present invention will be explained with reference to a flowchart in FIG. 4.

At Step S1, the power reception controller 5 determines whether or not the power reception device 2 is during the power reception operation from the power feeding device 10 from the communication with the power feeding device 10 or the power reception state of the power reception device 2. In a case of during the power reception operation, the processing is proceeded to Step S2, while in a case of during the non-power-reception operation, the processing is proceeded to Step S7. At Step S7, the power reception controller 5 switches the wiring switch 51 so that the operation signal output from the operation switch 31 is directly input into the locking/unlocking controller 41, finishes the processing, and repeats the processing of the power reception controller 5 from Step S11.

At Step S2, the signal determining part 52 of the power reception controller 5 determines whether or not the operation switch 31 has been operated, that is, whether or not the operation signal has been input from the operation switch 31. At Step S2, since the power reception device 2 is during the power reception operation, the wiring switch 51 connects the wiring so that the operation signal output from the operation switch 31 is directly input into the signal determining part 52. In a case where the operation signal has been input, the signal determining part 52 stores the operation signal and proceeds the processing to Step S3, while in a case where the operation signal has not been input, the signal determining part 52 finishes the processing and repeats the processing of the power reception controller 5 from Step S1.

At Step S3, the signal determining part 52 temporarily suppresses the power reception operation of the power reception device 2 by transmitting a signal requesting temporary stop of the power feeding to the power feeding device 10 through the wireless communication part 6 in response to the input of the operation signal.

At Step S4, the signal determining part 52 determines whether or not the power feeding operation of the power feeding device 10, that is, the power reception operation of the power reception device 2 has been suppressed to the predetermined state and the suppression has been completed from the communication with the power feeding device 10 or the power reception state of power reception device 2. In a case where the suppression has been completed, the processing is proceeded to Step S5, while in a case where the suppression has not been completed, the processing is returned to Step S3.

At Step S5, the signal determining part 52 outputs the operation signal stored at Step S2 to the locking/unlocking controller 41 in response to completion of the suppression of the power reception operation of the power reception device 2.

At Step S21, the locking/unlocking controller 41 determines whether or not the operation signal has been input. In a case where the operation signal has been input, the locking/unlocking controller 41 proceeds the processing to Step S22, while in a case where the operation signal has not been input, the processing is finished, and the processing at Step S21 is repeated.

At Step S22, the locking/unlocking controller 41 causes the LF transmitter 42 to transmit the predetermined LF signal at the second frequency.

At Step S31, the LF receiver 82 of the key device 8 located at a predetermined distance from the LF transmitter 42 receives the LF signal transmitted at Step S22 and outputs it to the key controller 81. At Step S32, the key controller 81 controls the RF transmitter 83 so that the RF transmitter 83 transmits the RF signal including an ID of the key device 8 in response to the input of the predetermined LF signal.

At Step S23, the locking/unlocking controller 41 determines whether or not the RF signal transmitted at Step S32 has been received by the RF receiver 43. In a case where the RF receiver 43 has received the RF signal, the locking/unlocking controller 41 proceeds the processing to Step S24, while in a case where it has not been received, the processing is finished, and the processing at Step S21 is repeated.

At Step S24, the locking/unlocking controller 41 determines whether or not the ID included in the RF signal received by the RF receiver 43 matches the ID stored in advance. In a case where the ID matches, the locking/unlocking controller 41 considers that the wireless communication with the key device 8 is successful and proceeds the processing to Step S25, while in a case where the ID does not match, the processing is finished, and the processing at Step S21 is repeated.

At Step S25, the locking/unlocking controller 41 outputs a control signal to the lock 32 and locks/unlocks the lock 32 in response to the successful wireless communication with the key device 8. Moreover, the locking/unlocking controller 41 outputs a locking/unlocking signal that instructs reproduction of a locking/unlocking sound notifying the user of locking/unlocking to the notification device 7.

At Step S6, the power reception controller 5 transmits a signal requesting cancellation of the temporary stop of the power feeding to the power feeding device 10 through the wireless communication part 6 in response to elapse of the set time set in advance from the processing at Step S5. As a result, the power reception controller 5 cancels the temporary suppression of the power reception operation of the power reception device 2.

According to the locking/unlocking system 1 according to the embodiment of the present invention, the wiring switch 51 is connected between the operation switch 31 and the locking/unlocking controller 41. As a result, during the power reception operation of the power reception device 2, the operation signal output from the operation switch 31 is input into the signal determining part 52, and during the non-power-reception operation, the operation signal is directly input into the locking/unlocking controller 41. Thus, according to the locking/unlocking system 1, a system that can reduce a sense of discomfort of the user during interference in the communication with the key device 8 by non-contact power transmission can be easily applied to the prior-art configuration relating to locking/unlocking.

Figure 4:
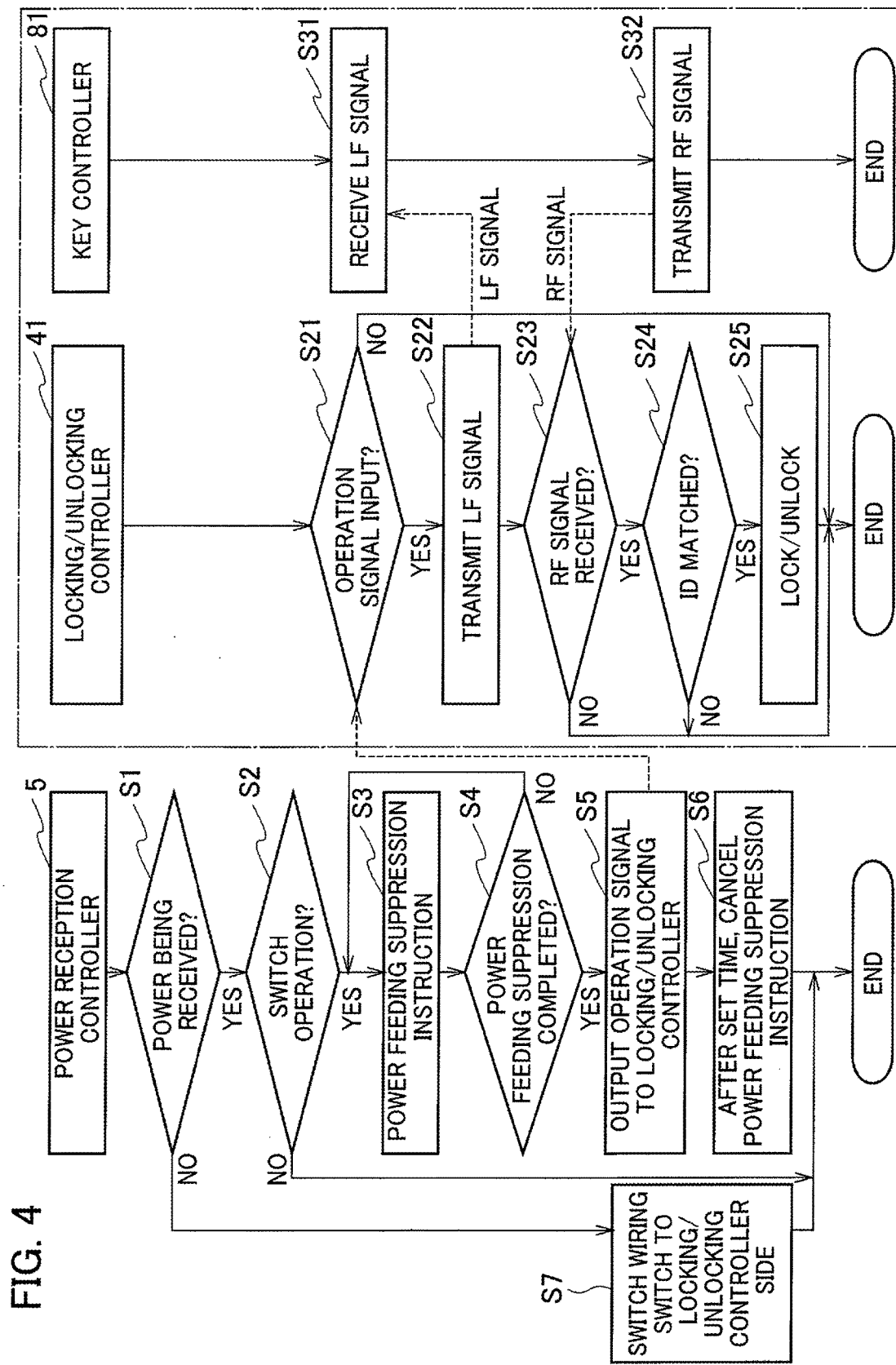
FIG. 4 is a flowchart for explaining an operation of the locking/unlocking system according to the embodiment of the present invention.

In the flowchart in FIG. 4, for example, the processing of the locking/unlocking controller 41 and the key controller 81 surrounded by a one-dot chain line is general processing and does not have to be changed from the prior-art configuration. As described above, the locking/unlocking system 1 can reduce the sense of discomfort of the user during interference by non-contact power transmission only by a slight change without rewriting the locking/unlocking controller 41.

Moreover, according to the locking/unlocking system 1, the signal determining part 52 stores the operation signal and outputs it to the locking/unlocking controller 41 in accordance with the suppression of the power reception operation of the power reception device 2. Thus, according to the locking/unlocking system 1, interference caused by non-contact power transmission can be reliably prevented.

According to the locking/unlocking system 1, the wiring switch 51 is constituted by the mechanical switch, and thus during the non-power-reception operation of the power reception device 2, the lock 32 of the vehicle V can be locked/unlocked even if the power reception controller 5 is not started. Thus, according to the locking/unlocking system 1, power consumption can be saved.

(Modified Example)

In the aforementioned embodiment, the case where the power reception 10, controller 5 suppresses the power reception operation of the power reception device 2 by requesting stop of power feeding from the power feeding device 10 in response to the operation signal has been explained, but the power reception operation of the power reception device 2 does not have to be necessarily controlled. Hereinafter, the locking/unlocking system 1 according to a modified example of the embodiment of the present invention will be described. Constitutions, actions, and advantageous effects not described below are substantially similar to those of the aforementioned embodiment and duplicated and thus, omitted.

Figure 5:
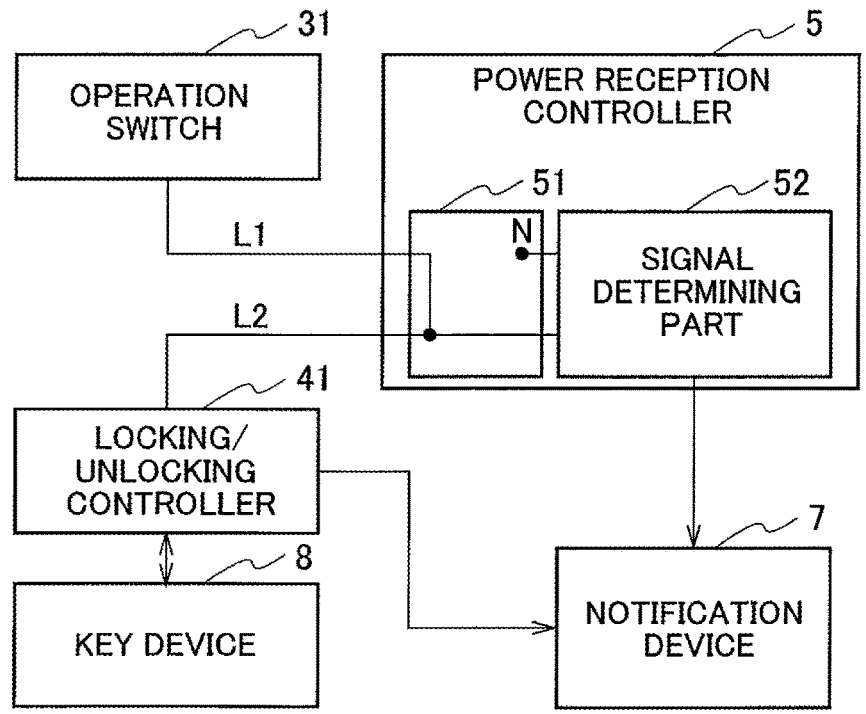
FIG. 5 is a block diagram for explaining a state of a wiring switch provided in a locking/unlocking system according to a modified example of the embodiment of the present invention when a power reception device is during the non-power-reception operation.
Figure 6:
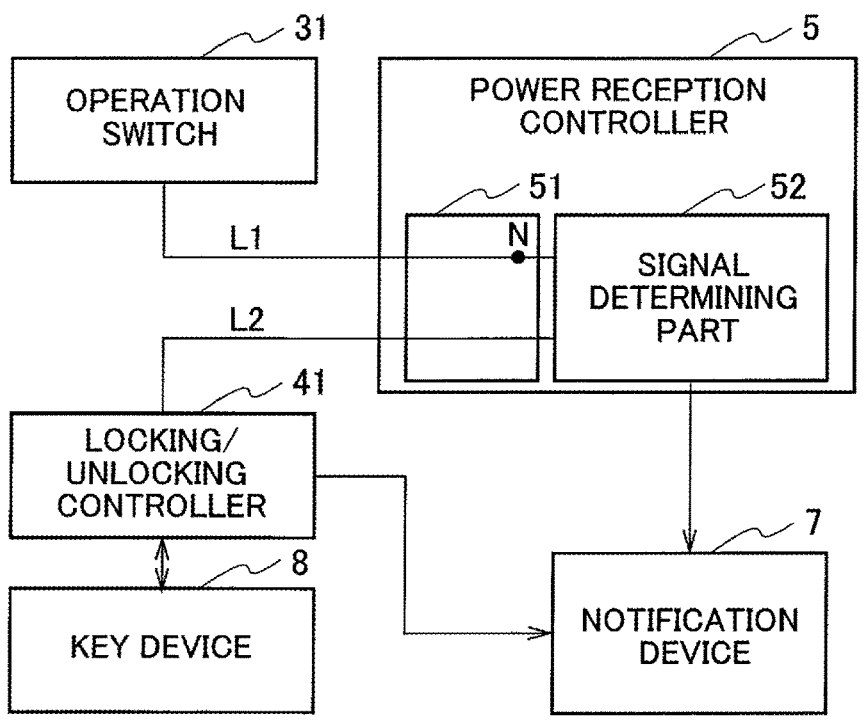
FIG. 6 is a block diagram for explaining a state of the wiring switch provided in the locking/unlocking system according to the modified example of the embodiment of the present invention when the power reception device is during the power reception operation.

As illustrated in FIGS. 5 and 6, in the locking/unlocking system 1 according to the modified example of the embodiment of the present invention, the notification device 7 is connected to the signal determining part 52 so that information can be notified to the user in accordance with control by the signal determining part 52 of the power reception controller 5.

The wiring switch 51 connects the wiring so that the operation signal output from the operation switch 31 is directly input into the locking/unlocking controller 41 during the non-power-reception operation of the power reception device 2 as illustrated in FIG. 5. The wiring switch 51 connects the wiring so that the operation signal output from the operation switch 31 is directly input into the signal determining part 52 during the power reception operation of the power reception device 2 as illustrated in FIG. 6.

Figure 7:
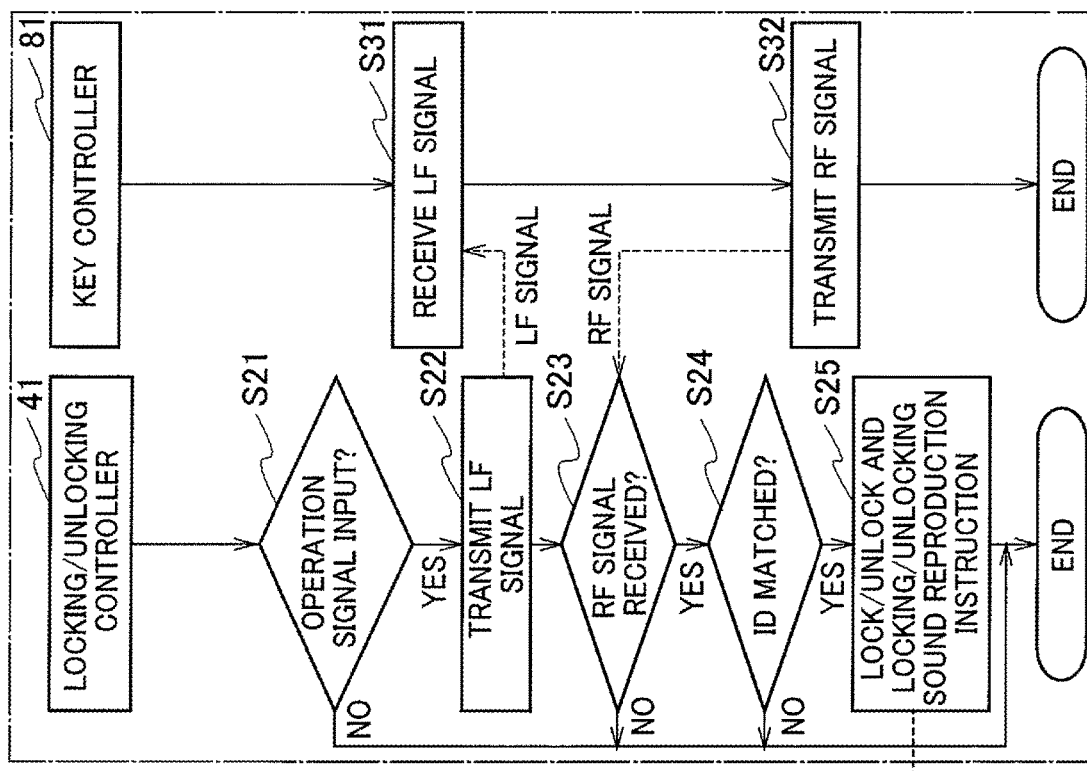
FIG. 7 is a flowchart for explaining an operation of the locking/unlocking system according to the modified example of the embodiment of the present invention.
Figure 7:
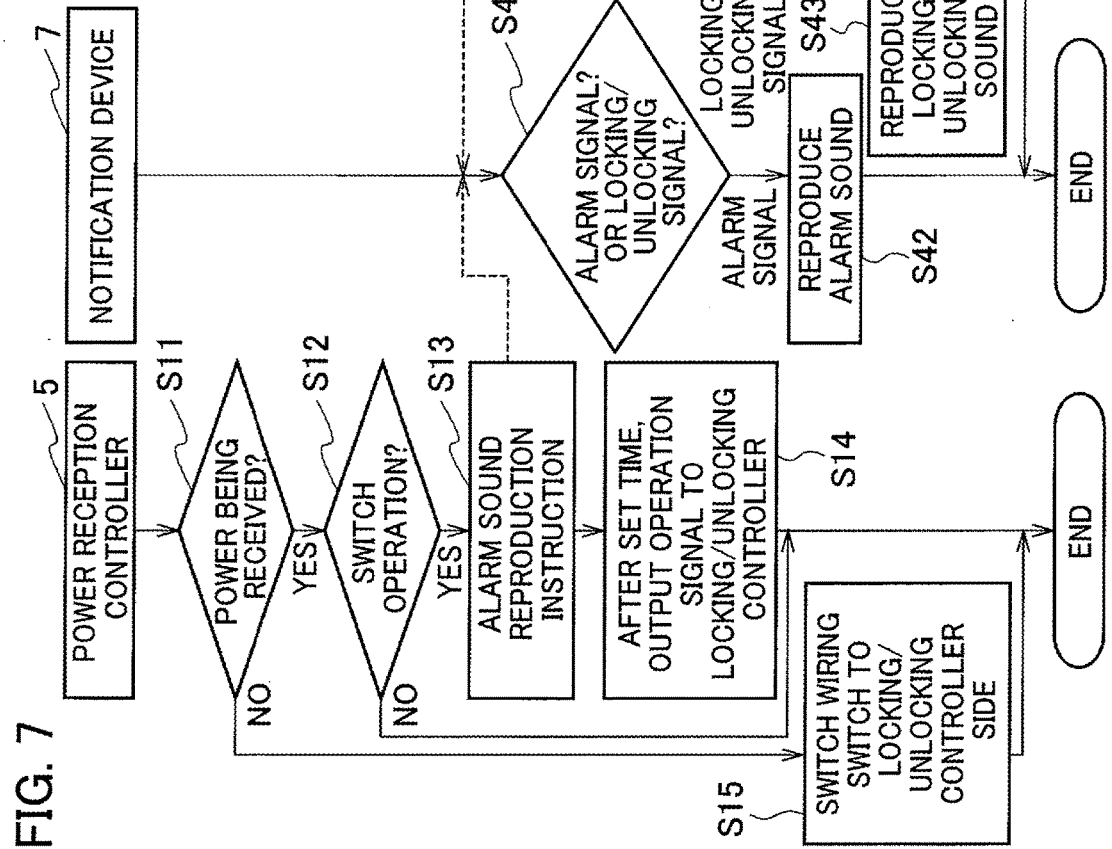

With reference to the flowchart in FIG. 7, an example of an operation of the locking/unlocking system 1 according to the modified example of the embodiment of the present invention will be explained.

At Step S11, the power reception controller 5 determines whether or not the power reception device 2 is during the power reception operation from the power feeding device 10 from the communication with the power feeding device 10 or the power reception state of the power reception device 2. In a case of during the power reception operation, the processing is proceeded to Step S12, while in a case of during the non-power-reception operation, the processing is proceeded to Step S15. At Step S15, the power reception controller 5 switches the wiring switch 51 so that the operation signal output from the operation switch 31 is directly input into the locking/unlocking controller 41, finishes the processing, and repeats the processing of the power reception controller 5 from Step S11.

At Step S12, the signal determining part 52 of the power reception controller 5 determines whether or not the operation signal has been input from the operation switch 31. At Step S12, the wiring switch 51 connects the wiring so that the operation signal output from the operation switch 31 is directly input into the signal determining part 52. In a case where the operation signal has been input, the signal determining part 52 stores the operation signal and proceeds the processing to Step S13, while in a case where the operation signal has not been input, the processing is finished, and the processing of the power reception controller 5 is repeated from Step S11.

At Step S13, the signal determining part 52 outputs an alarm signal instructing reproduction of an alarm sound alarming that the power reception device 2 is during the power reception operation to the notification device 7 in response to the input of the operation signal. When an alarm signal is input at Step S41, the notification device 7 reproduces the alarm sound at Step S42 and notifies the user that the power reception device 2 is during the power reception operation.

At Step S14, the signal determining part 52 outputs the operation signal stored at Step S12 to the locking/unlocking controller 41 in response to elapse of set time set in advance from the processing at Step S12. The set time can be time until the alarm sound instructing reproduction at Step S13 is stopped, for example.

Processing at Steps S21 to S25 and Steps S31 to S32 are similar to the flowchart in FIG. 4, and the explanation will be omitted. When the locking/unlocking signal output at Step S25 is input at Step S41, the notification device 7 reproduces the locking/unlocking sound at Step S42 and notifies the user that the lock 32 is locked/unlocked.

According to the locking/unlocking system 1 according to the modified example of the embodiment of the present invention, the notification device 7 reproduces the locking/unlocking sound in response to the operation of the operation switch 31 during the power reception operation of the power reception device 2. Thus, a possibility of interference in the communication between the vehicle V and the key device 8 since the power reception device 2 is during the power reception operation can be notified to the user. Thus, even if interference occurs in the communication with the key device 8, the user can understand that it is caused by power feeding from the power feeding device 10, and the sense of discomfort during interference is reduced.

(Other Embodiments)

As described above, the present invention has been described in the embodiment, but the description and drawings forming a part of this disclosure should not be understood to limit the present invention. From this disclosure, various alternative embodiments, examples, and operation technologies are made apparent to those skilled in the art.

For example, in the already described embodiments, the lock 32 may be various locks other than a door lock, such as a lock in an ignition switch.

Other than the above, it is needless to say that the present invention includes various embodiments and the like not described here, such as constitution in which each of the aforementioned constitutions is mutually applied. Therefore, a technical scope of the present invention is determined only by invention specifying matters according to a scope of claims appropriate from the aforementioned explanation.

INDUSTRIAL APPLICABILITY

According to the present invention, a locking/unlocking system can be provided which can easily apply a system which can reduce a sense of discomfort of a user during interference by non-contact power transmission by changing wiring between during a power reception operation and during a non-power-reception operation.

REFERENCE SIGNS LIST

V vehicle
1 locking/unlocking system
2 power reception device
5 power reception controller
7 notification device
8 key device (key)
11 ground coil
21 vehicle coil
31 operation switch
32 lock
41 locking/unlocking controller
51 wiring switch
52 signal determining part.

The invention claimed is:

1. A locking/unlocking system comprising:
a power reception device that is provided in a vehicle and has a vehicle coil which is configured to receive power at a first frequency from a ground coil provided on a ground in a non-contact manner during a power reception operation;
an operation switch that is provided in the vehicle and is configured to output an operation signal in response to a user operation;
a locking/unlocking controller configured to conduct wireless communication at a second frequency close to the first frequency with a key device located within a predetermined distance in response to an input of the operation signal and to lock/unlock a lock provided in the vehicle in response to successful wireless communication with the key device;
a signal determining part that is configured to receive the operation signal from the operation switch and to output the operation signal to the locking/unlocking controller when the signal determining part is electrically connected to the operation switch; and
a wiring switch configured to
electrically disconnect the operation switch from the signal determining part and electrically connect the operation switch and the locking/unlocking controller when the power reception device does not receive power, and
electrically connect the operation switch and the signal determining part and electrically connect the signal determining part and the locking/unlocking controller when the power reception device receives power during the power reception operation,
wherein the wiring switch is a separate member from the signal determining part.

2. The locking/unlocking system according to claim 1, wherein the signal determining part is configured to
suppress the power reception operation in response to an input of the operation signal into the signal determining part, and
store the operation signal and output the stored operation signal to the locking/unlocking controller in response to completion of suppression of the power reception operation.

3. The locking/unlocking system according to claim 1, further comprising:
a notification device configured to notify a user of information,
wherein
the signal determining part is configured to output an alarm to the notification device in response to an input of the operation signal in the signal determining part, and
in response to an input of the alarm to the notification device, the notification device is configured to notify the user that the power reception operation is taking place.

4. The locking/unlocking system according to claim 1, wherein
the wiring switch is a mechanical switch.

5. A locking/unlocking system comprising:
a power reception device that is provided in a vehicle and has a vehicle coil which is configured to receive power at a first frequency from a ground coil provided on a ground during a power reception operation;
a first switch that is provided in the vehicle and configured to output an operation signal in response to a user operation;
a controller configured to conduct wireless communication at a second frequency with a key device in response to an input of the operation signal and to lock/unlock a lock provided in the vehicle in response to wireless communication with the key device;
a signal determining controller part configured to receive the operation signal from the first switch and to output the operation signal to the controller when the signal determining controller part is electrically connected to the first switch; and
a second switch configured to
electrically disconnect the first switch from the signal determining controller part and electrically connect the first switch and the controller when the power reception device does not receive power, and
electrically connect the first switch and the signal determining controller part, and electrically connect the controller and the signal determining controller part, when the power reception device receives power,
wherein the second switch is a separate member from the signal determining controller part.

* * * * *